INVENTOR.
PIERRE DE VITRY D'AVAUCOURT
BY
M. W. Gould
ATT'Y

*INVENTOR.*
PIERRE DE VITRY D'AVAUCOURT
BY
ATT'Y

Patented May 15, 1951

2,553,528

UNITED STATES PATENT OFFICE 2,553,528

SURFACING MACHINE FOR PRODUCING LENSES AND SIMILAR ARTICLES

Pierre de Vitry d'Avaucourt, Bainbridge, Pa.

Application June 5, 1947, Serial No. 752,725

4 Claims. (Cl. 51—55)

This invention relates to surfacing machines and has particular reference to an improved apparatus for producing lenses and similar articles of single and compound curvatures and to an improved process for producing said lenses and similar articles.

One of the principal objects of the invention is to provide improved means for surfacing articles such as lenses to various surface formations including single and compound curvatures and an improved process of abrading whereby the resultant surfaces will have a relatively smooth and fine texture.

Another object is to provide a surfacing machine of the above character embodying means for feeding a cup-type abrading tool transversely of an article, such as a lens, to abrade a surface on said article of a single or compound curvature, depending upon the angle at which said tool is disposed relative to the work and depending upon the radius of curvature about which the tool is moved transversely of the article, in combination with means for controlling the rate of transverse movement of the tool relative to the article whereby the tool will be fed transversely of said article at a speed substantially equal to the rate of removal of said tool.

Another object is to provide a surfacing machine of the above character which will generate surface shapes of positive and negative forms of various different single or compound curvatures.

Another object is to provide a surfacing machine of the above character with a cup or ring-type abrading tool so supported that it may be disposed at various different angles relative to the article to be abraded with substantially no change of the positional relation of the tool with respect to the article.

Another object is to provide a surfacing machine of the above character having its abrading tool and article to be abraded confined within a housing, in combination with means for directing a lubricant to the engaging surfaces of said tool and article, with the housing confining the lubricant and material removed from the article within said housing and preventing said material and lubricant from gaining access to other working parts of the machine.

Another object is to provide a floating feed arrangement for moving the tool transversely of the article.

Another object is to provide a feed arrangement for moving the tool transversely of the article which embodies means for causing the tool to be floatingly moved in said transverse direction in combination with variable cushioning means acting in opposition to said first named means.

Another object is to provide a feed arrangement for moving the tool transversely of the article, which feed arrangement embodies a weight suspended upon a cord connected with the tool support for imparting said transverse movement, in combination with variable pneumatic means also connected with said tool support in such a manner as to resist the gravital pull of the weight and which also functions as shock absorbing or cushioning means.

Another object is to provide a machine of the above character with means for adjusting the tool relative to the work and the work relative to the tool, with said adjustment means embodying an arrangement whereby the major changes of adjustments may be quickly and easily performed and more accurate and finer adjustments may be subsequently performed.

A further object is to provide a rotating lap together with means for adjusting the lap both radially and angularly with respect to a pivot post and a diameter running through said pivot post respectively.

A still further object is to provide means for supporting the article which may be adjusted radially of the pivot post whereby said article may be brought into contact with the rotating lap and the amount of material to be removed from said article may be controlled.

A still further object is to provide yielding means for swinging said lap or tool on said pivot post and to provide means for controlling the rate of said swing.

These and other objects will be brought out in specific detail described in the specification and set forth in the claims.

With the foregoing and other objects in view, the invention resides in the novel arrangement and combination of parts, in the details of construction and steps of the process hereinafter described and claimed, it being understood that changes in the precise embodiment of the invention herein described may be made within the scope of what is claimed without departing from the spirit of the invention.

The invention is shown in the accompanying drawings in which:

Figure 7 is an enlarged perspective view of the holder for the article or lens to be abraded.

Figure 8 is an enlarged fragmentary sectional view taken as on line 8—8 of Figure 2 and looking in the direction indicated by the arrows.

Figure 11 is an enlarged fragmentary sectional view taken as on line 11—11 of Figure 1 and looking in the direction indicated by the arrows.

Figure 12 is an enlarged fragmentary sectional view taken as on line 12—12 of Figure 1 and looking in a downward direction.

Figure 13 is a fragmentary sectional view showing the housing and lubricant or coolant feeding means.

Figure 1:
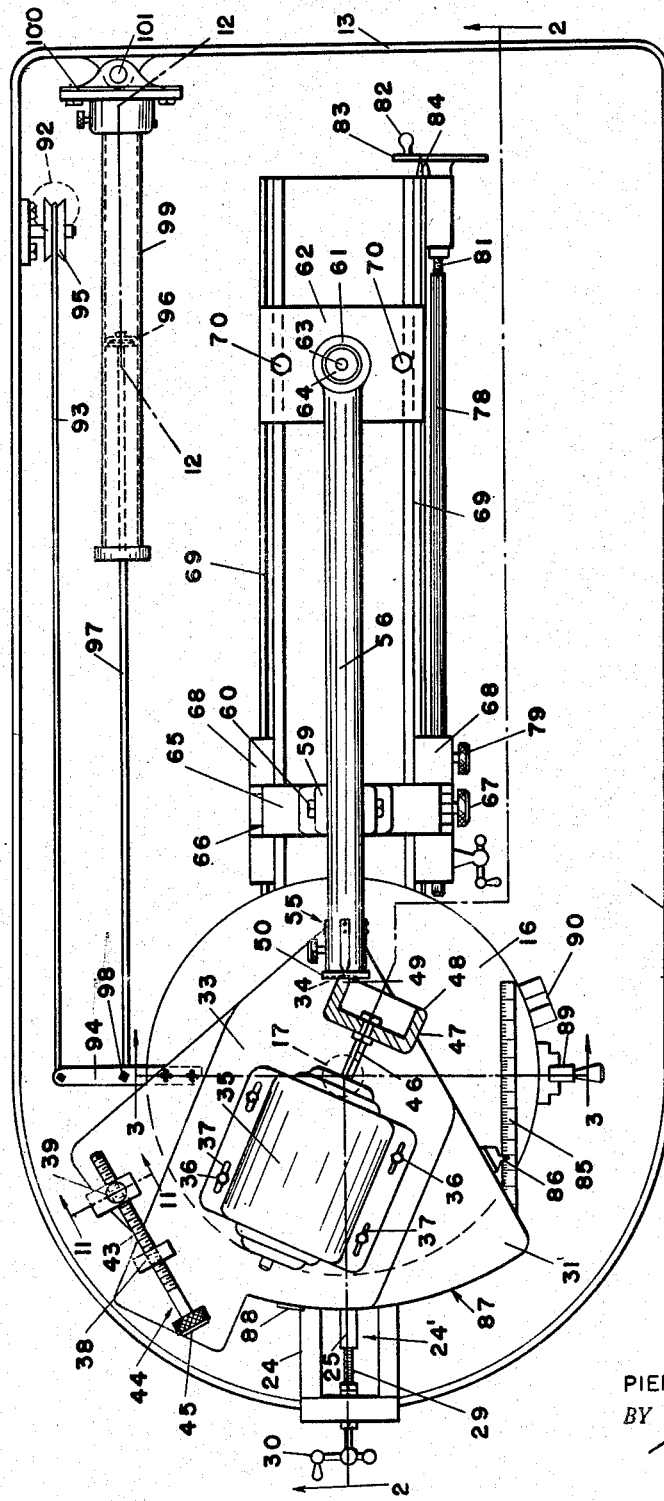
Figure 1 is a top plan view of the surfacing machine embodying the invention and showing a minus curve generator.
Figure 2:
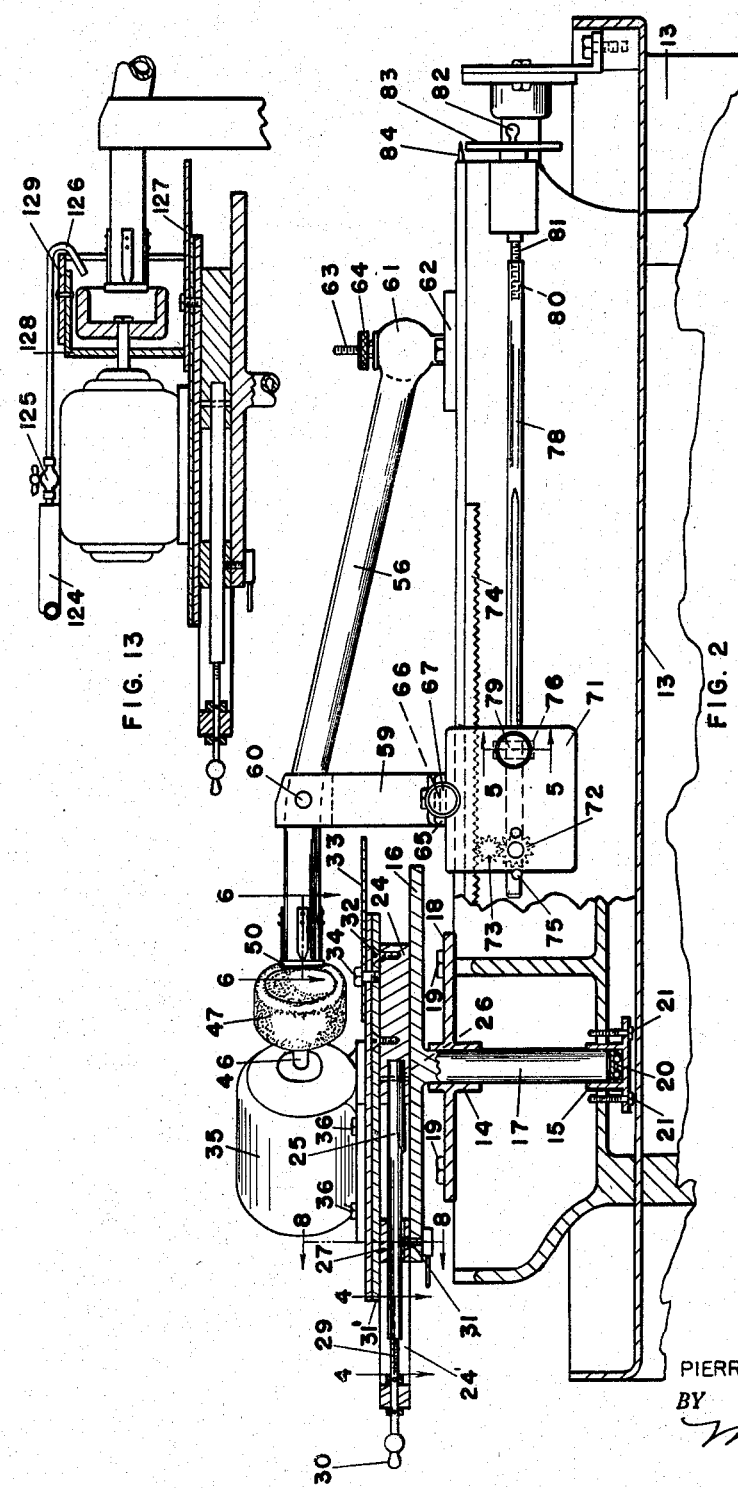
Figure 2 is a longitudinal fragmentary sectional view taken as one line 2—2 of Figure 1 and looking in the direction indicated by the arrows.
Figure 3:
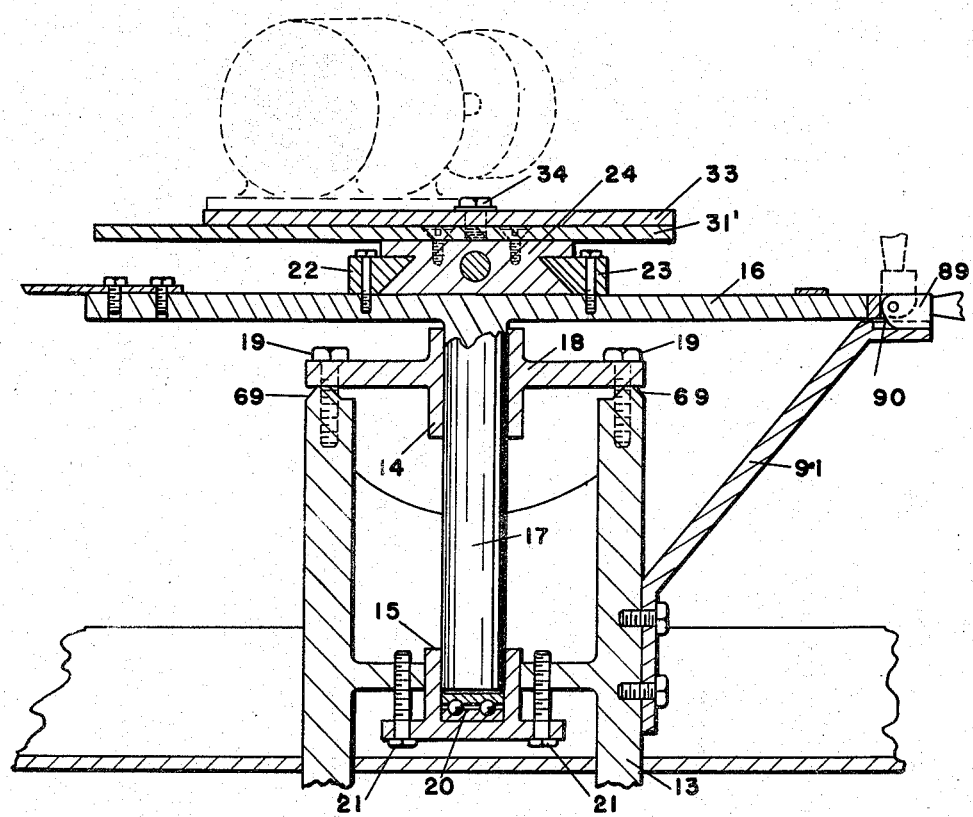
Figure 3 is an enlarged fragmentary sectional view taken as on line 3—3 of Figure 1 and looking in the direction indicated by the arrows.
Figure 4:
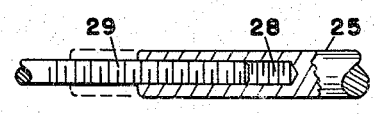
Figure 4 is an enlarged fragmentary sectional view taken as on line 4—4 of Figure 2 and looking in the direction indicated by the arrows.

Referring more particularly to the drawings wherein like characters of reference designate like parts thoughout the several views, the form of machine shown primarily in Figures 1, 2 and 3 is for generating or surfacing minus curvatures and comprises a base 13 having, adjacent one end thereof, spaced bearings 14 and 15 in which a rotatable plate 16 is supported by a pivot post 17. The bearing 14 is carried by a plate 18 connected to said base by bolts or the like 19. The bearing 15 is provided with an end thrust roller bearing portion 20 and the entire bearing assembly is adjustably connected to the base by the bolts or the like 21 whereby the plate 16 may be raised or lowered as desired. Secured to and rigid with the plate 16, as shown best in Figure 3, are slide tracks 22 and 23 in which is slidably supported a slide member 24. The slide member 24 is provided with a slotted portion 24′ and said slide has a bar 25 secured thereto by a pin or the like 26. The bar 25 projects outwardly into said slot 24′ and extends through a block 27 which is secured to the plate 16 by bolts or the like 27′ and which lies within the slot 24′, see Figure 8. The bar 25, as shown in Figure 4, is provided with a threaded bore 28 adapted to receive a screw 29 operated through a handle 30, as shown in Figures 1, 2 and 4. A clamp screw 31, as shown best in Figures 2 and 8, is adapted to lock the bar with the block 27 when the slide is moved to the desired adjusted position relative to the plate 16.

The slide 24 has a quadrant-shaped plate 31′ secured thereto by screws or the like 32. The quadrant-shaped plate 31′ has a second plate 33 lying flat thereon and pivotally connected with said plate 31′, adjacent the inner end thereof, by a pivot bolt or the like 34, see Figure 2. The plate 33 has a motor 35 adjustably connected thereto by means of the bolts or the like 36 which extend through the longitudinal slots 37 in the base of the motor. The function of this adjustable connection will be described more in detail hereinafter.

The plate 33 has a member 38 with a threaded bore therein pivotally connected thereto. The quadrant-shaped plate 31′ has a member 39 rotatably supported in a block 40 which is clamped to the quadrant-shaped plate 31′ by a clamp screw or the like 41. The member 39 is provided with a threaded bore 42 which is adapted to receive the threaded portion 43 of the screw member 44. The screw member 44 extends through the threaded bore in the member 38 and has a knurled head 45 by means of which the said screw may be rotated and which provides means for adjusting the second plate 33 relative to the quadrant-shaped plate 31′ about the pivotal connection 34.

The motor 35 drives a shaft 46 to which a cupped or ring-type tool 47 is secured. The tool 47 is preferably of a diamond impregnated or charged-type and has its abrading portion 48 formed with a curved cross-section and is adapted to be supported with its center of curvature 49 in alignment with the longitudinal axis of the pivot 34, see Figure 1. This arrangement enables the second plate 33, which carries the motor and the abrading tool, to be swung about the pivot 34 by means of the screw member 44 without changing the position of the cutting edge of the tool relative to the article 50 to be abraded.

The bolt and slot connections 36 and 37 respectively enable the center 49 of the curved face of the tool, shown in Figure 1, to be adjusted so as to be co-axial with the axis with the center of the pivot 34 and provides means for compensating for wear of the surface of the cutting edge of the tool.

Figure 6:
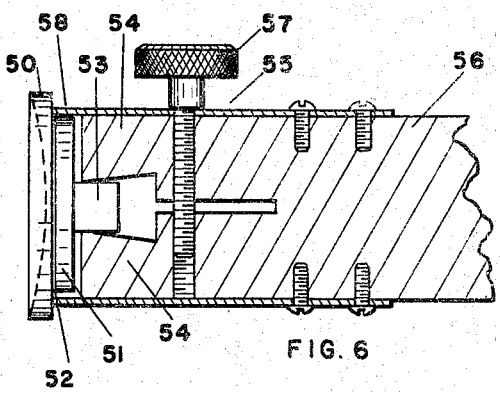
Figure 6 is an enlarged fragmentary ssectional view taken as on line 6—6 of Figure 2 and looking in the direction indicated by the arrows.

The article or lens blank 50 which is to be abraded is adhesively secured to the block 51 by means of a layer of pitch or other suitable adhesive 52, see Figures 6 and 7. The block 51 is provided with a protrusion 53 which is clamped between the jaws 54 of a chuck 55 formed on the end of a bar-like holder 56. The jaws 54 are drawn together by means of a clamp screw or the like 57. The chuck is provided with a plurality of fingers 58 against which the rear surface of the article or lens blank 50 is adapted to be seated when the holder 51 is being clamped in the chuck. This accurately supports the blank in the proper plane during the abrading.

The bar-like holder is pivotally connected to a bracket 59, as illustrated at 60, and has its rearmost end 61 connected to a plate 62 by means of a screw and nut arrangement 63 and 64 respectively.

The bracket 59 is carried by a slide member 65 which is slidably supported in a transverse slideway 66 and may be adjusted longitudinally of the slideway 66 by means of an adjusting screw 67. The slideway 66 is supported by spaced slide members 68, substantially normally disposed with respect to the transverse slide 65, and slidably supported on the spaced slideways 69 formed on the base 13. The plate 63 is connected to a slide member beneath said plate by means of bolts or the like 70, which slide member is also slidably supported on the spaced slideways 69.

Figure 5:
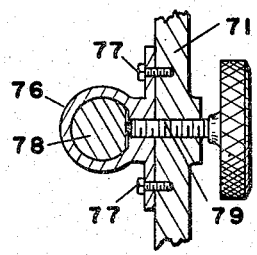
Figure 5 is an enlarged fragmentary sectional view taken as on line 5—5 of Figure 2 and looking in the direction indicated by the arrows.

One of the slide members 68 is provided with an apron 71 which pivotally supports a gear member 72 which meshes with an intermediate gear 73 which in turn meshes with a rack 74. The gear 72 is pivotally connected with the apron and may be rotated by means of the crank member 75. A block 76, as shown in Figures 2 and 5, is secured to the apron 71 by means of the bolts or the like 77 and has a hollow bore through which a bar 78 is slidably extended. The bar may be locked in fixed relation with the block 76 by means of a clamp screw or the like 79.

The bar 78, adjacent its end opposed to the portion extending through the hollow bore of the block 76, is provided with a threaded bore 80 in which a screw member 81 is extended. The screw member 81 is rotated by means of a crank member 82 and is provided with a disk 83 having a graduated scale thereon functioning cooperatively with a suitable indicator 84 carried by the base of the machine and by means of which the amount of adjustment of the screw member 81 may be determined. By referring back to Figure 2 particularly, it will be noted that the slide 24, quadrant-shaped plate 31', second plate 33, motor 35 and tool 47 are all carried by the rotatable plate 16 and are adapted to move with said plate when it is turned about the axis of the pivot post 17.

The operation of the surfacing machine is as follows:

The portion of the abrading tool which is to be engaged by the article or lens blank to be abraded is first adjusted to the desired distance from the axis of the pivot post 17 to control the arc of the curve to be generated in the horizontal meridian of said article or lens blank to be abraded. This is accomplished by loosening the lock screw 31 which will permit relatively quick manual adjustment of the slide member 24 longitudinally of the slideway 23 carried by the rotatable plate 16. This gives the approximate adjustment required and the finer vernier adjustment is then accomplished by again tightening the clamp screw 31 and by rotation of the screw 29 by the crank member 30.

The extent of the above adjustments or proper settings may be determined by a suitable scale 85 carried by the rotatable plate 16 and an indicator 86 carried by the slide member 24.

It is particularly pointed out that the curve which is generated will be of the concave or negative form, as shown best in Figures 1 and 6, and the radius of curvature is dependent upon the distance at which the cutting edge or the center 49 of the cutting edge is adjusted with respect to the longitudinal axis of the pivot post 17. The arrangement, therefore, provides for various differently controlled curves to be formed in this meridian.

The curve generated in the vertical meridian of the article or lens blank to be abraded is controlled by the swinging of the cup tool 47 relative to the longitudinal axis of the holder and relative to the plane of the blank. It is pointed out that the longitudinal axis of the holder 56 is adjusted to intersect the axis of the pivot post 17 in perpendicular relation thereto and remains in this relation during the use of the machine. These adjustments are accomplished by the transverse slideway 66 and by swinging the bar-like holder 56 on the pivot 60 by adjustment of the nut 64.

The tool 47 is adjusted in the following manner. The clamp screw 41 is first loosened and the plate 33 is swung about the center of the pivot 34 manually to the approximate position. This provides a relatively quick adjustment whereby the block 40 will move relative to the plate 31. The clamp screw is then tightened and the screw 44 is rotated to obtain the fine or vernier adjustment. The setting is made on a scale 87 provided on the outside edge of the quadrant-shaped plate 31' and functions cooperatively with a suitable indicator 88 carried by the plate 33.

If the curve to be generated on the article or blank 50 is to be a single spherical-type curve, the tool 47 is angled so as to generate a curve in the vertical meridian of the lens which corresponds in radius to the curve generated by the swing of the tool in a horizontal direction about the center of the pivot post 17. The two curves therefore will be of the same radius and will thereby generate a single spherical curve.

If the surface is to have a compound curvature then the adjustments are made so as to introduce the different radii of curvatures desired in the respective vertical and horizontal meridians.

After the above mentioned adjustments have been made, the article or blank 50 carried by the holder 56 may be moved into engagement with the tool by first loosening the set screw 79 and then rotating the crank 75 in the proper direction whereupon the gears 72 and 73 will be rotated and the rack 74, carried by the base of the machine, will cause the slides 68 and the slide to which the plate 62 is attached to move longitudinally of the slideway 69. This provides a relatively quick adjustment for initially moving the blank into engagement with the cutting edge of the tool. The amount of material to be removed from the blank may then be controlled by tightening the set screw 79 and by rotating the crank 82. This will cause the screw 81 to rotate and the bar 78 will then function to move the slide members longitudinally of the slideways 69 and will retain the holder 56 in fixed adjusted position. The amount of material to be removed from the blank may be determined by the position of the scale 83 relative to the indicator 84.

After the blank has first been moved into engagement with the cutting edge of the tool and prior to making the fine adjustment for determining the extent of the material to be removed from the article or blank 50, the tool 47 is swung in a sidewise direction about the axis of the pivot post 17 to a position out of engagement with the blank. It may be held in this position by means of a latch member 89 pivotally connected to the rotatable plate 16 and adapted to engage within a slot 90 formed in the upper end of a support 91 carried by the base 13.

The tool 47 is fed transversely of the article or blank 50 by means of the gravital pull of a weight 92 carried by a cord 93 which is attached to a bracket 94 carried by the rotatable plate 16. The cord extends over a pulley 95 and responds to the gravital pull of the weight 92 when the latch member 89 is disengaged from the slot 90 and the head is free to swing about the center of the pivot post 17. The gravital pull of the weight 92 is resisted by means of a piston 96 carried by a rod 97 pivotally connected at 98 to the bracket 94 and operating within a cylinder or tubular member 99. The cylinder 99 is carried by a base 100 which is pivotally connected at 101 to the base 13. The cylinder 99, as shown best in Figure 12, is provided with a bleeder valve 102 which comprises a vent opening 103 having a tapered seat 104 therein and a threaded valve stem 105 having a tapered end portion 106 adapted to be adjusted to desired spaced relation with the tapered seat 104 by rotation of the threaded stem 105. By proper adjustment of the valve stem 105, the escape of air in the cylinder 99 is regulated and the rate of swing of the plate 16 and the entire assembly is yieldably controlled. This provides a dashpot arrangement which not only functions in opposition to the gravital pull of the weight 92 but also acts as a shock absorbing means to prevent vibratory movement of the tool 47 relative to the article or blank 50 during the abrading and the entire feed may be adjusted so as to substantially keep pace with the rate of removal of the cutting tool thereby enabling the forming of a very finely abraded surface and one having relatively smooth and fine texture.

The controlling of the rate of swing is entirely in one direction as it merely retards the rate of swing between the fast swing caused by the weight attached to the cord 97 and a swing so small that the eye cannot observe the advance of the tool across the article or lens blank. This yieldable control is a strong factor in the cutting of the lens as heretofore a positive advance of the tool often caused breakage or chipping of the article or lens blank and also a rough finished surface. As the most uniform glass never cuts at exactly the same rate of speed, the yieldable controlled drive of the tool across the face of the article or lens blank is a positive factor in producing a true and relatively smooth cut.

Figure 9:
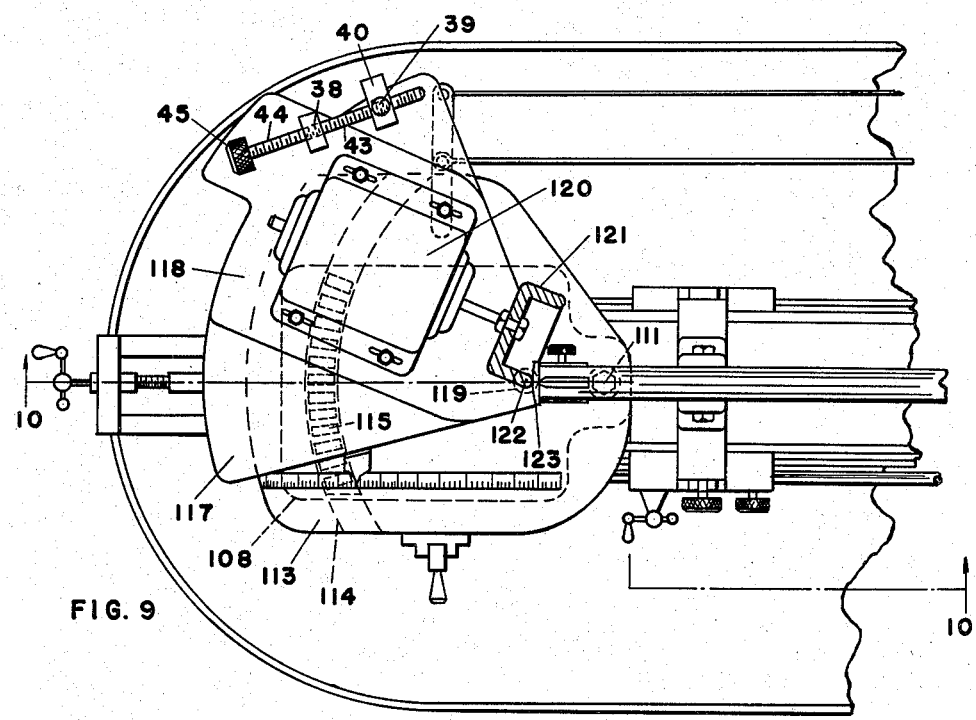
Figure 9 is a partial top plan view of a surfacing machine embodying the invention showing a plus curve generator.
Figure 10:
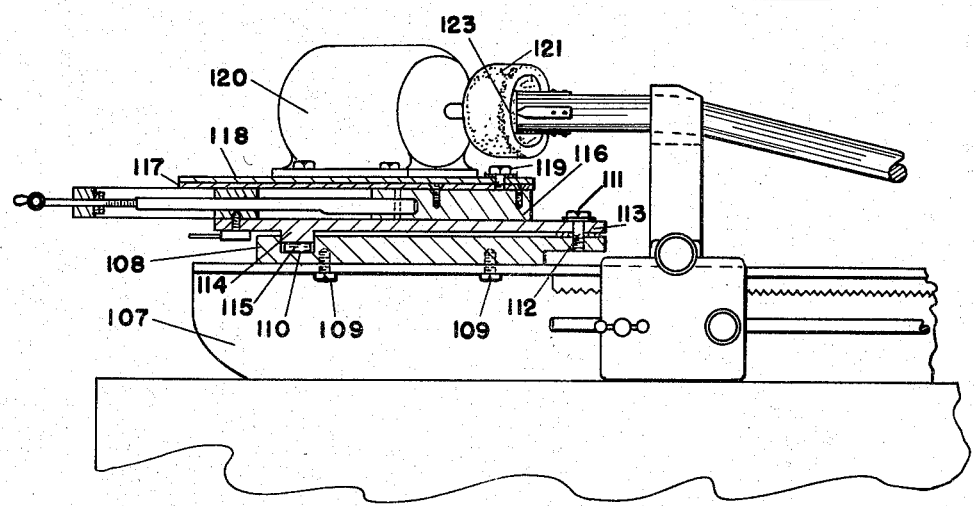
Figure 10 is a fragmentary sectional view taken as on line 10—10 of Figure 9 and looking in the direction indicated by the arrows.

In Figures 9 and 10, there is shown a surfacing machine for producing convex or positive surface shapes and embodying a slight modification of the invention. The base 107, which corresponds with the base 13, has a plate 108 secured thereto by bolts or the like 109. The plate 108 has an arcuate guideway 110 therein and having its center of curvature at the axis 111 of a pivot bolt 112 to which a rotatable plate 113, corresponding to the plate 16, is pivotally connected. The said plate 113 has an arcuate rib 114 thereon adapted to engage roller bearings 115 inwardly of the arcuate guideway 110. The plate 113 has a slide member 116 slidably connected therewith, simulating the slide 24. The slide 116 has a plate 117 secured thereto, similar to the plate 31'. The plate 117 has a second plate 118 pivoted thereto at 119, similar to the plate 33, and to which the motor 120 is connected. The tool 121 has its effective abrading portion provided with a curved surface and its center 122 is supported coaxially with the longitudinal axis of the pivot 119. In this instance, the abrading action takes place on the concave side of the tool thereby causing the outer surface 123 of the article or lens blank being ground to be of a convex or positive curve. The radius of curvature of the surface generated on the article or lens blank in the vertical meridian therefor depends upon the extent of angling of the tool relative to the axis of the lens holder and plane of the blank. The various adjustments, and mechanisms for accomplishing the same, are identical with those of the first described machine and the general operation of the machine is the same. The curvature in the horizontal meridian of the article or lens blank being abraded depends upon the adjusted distance between the longitudinal axis 111 of the pivot about which the tool is swung and the engaged cutting edge of the tool and single and compound curvatures of different radii may be produced. This machine, like the first described machine, also has the same gravital feed arrangement and adjustable pneumatic means for resisting the same.

The process of abrading with either of the above described machines embodies first the proper centering and securing of the article or lens blank 50 to its holder 51 and securing the blank in the chuck with its rear surface engaging the fingers 58 thereof, as shown best in Figure 6. The ends of the fingers 58 all being formed to lie in a single plane normal or perpendicular to the longitudinal axis of the holder, which longitudinal axis is radial with and intersects the axis of the pivot about which the tool is swung, either 17 or 111 as the case may be, eliminates the introduction of prism in the finished article or lens. The tool is then adjusted toward or away from the work and by reference to the scale and indicator means, such as 85 and 86, the distance between the center of the axis about which the tool is swung, that is, either 17 or 111, and the engaging abrading portion of the tool is varied to control the radius of curvature generated along the horizontal axis or meridian of the article or lens blank. The cupped tool 47 or 121, as the case may be, is then angled as previously described to control the radius of curvature along the vertical meridian of the lens. The tool is then manually swung to a position out of engagement with the article or lens blank, the lens blank holder is then adjusted in a direction toward the tool by an amount controlled according to the material to be removed from the article or lens blank. The tool is then released to respond to the gravital pull of the weight which tends to move and feed the tool in a direction transversely of the blank, while the said tool is being rotated by the motor, and the pneumatic means functions in opposition to the gravital pull of the weight and thereby controls the rate of feeding of said tool transversely of said article or lens blank and also functions to cushion the movement of said tool. The function of the pneumatic means may be varied by adjustment of the bleeder valve, such as shown in Figure 12 and the speed of the feed thereby controlled.

A lubricant or coolant is fed onto the engaging portions of the tool and article or lens blank being abraded through a suitable pipeline 124. The pipeline has a valve member 125 therein for controlling the flow of the lubricant or coolant and is provided with an adjustable nozzle 126 to insure that the lubricant is directed to the proper source.

The tool and article or lens blank to be abraded, as shown in Figure 13, has a housing surrounding the same to confine the flow of the lubricant and material removed from the article or lens blank within the housing and for preventing the lubricant from being splashed or otherwise gaining access to other working parts of the machine.

The housing comprises a base portion 127, a top portion 128, and opposed side portions 129 pivotally supported so that the said side portions may be swung sidewise in a direction away from and toward the abrading tool and supported article or lens blank. The said side portions are formed with converging ends to enable the said ends to be positioned in relatively intimate or closed relation about the said tool and blank.

From the foregoing description, it will be seen that simple, efficient and economical means have been provided for accomplishing all of the objects and advantages of the invention.

What is claimed is:

1. A lens surfacing device of the character described for simultaneously producing a desired lens surface shape having a finely abraded texture on a lens member to be subsequently polished comprising a support for holding the lens member with its surface exposed for abrading action, a rotatable cupped abrading tool member impregnated with abrasive particles and carried by a second support, one of said members being mountable with its support for reciprocal movement through an arcuate path between a pair of limited positions, one position being to the left and the other being to the right of the other member, and said path of movement being defined by an axis spaced from and substantially parallel with the general plane in which the surface of the lens member is supported, said movable member being normally maintained at rest at one of said positions and manually movable with its support to the other position, holding means on the device for releasably retaining said member at said second position, and manually operable adjustable means for bringing one of said members controllable amounts into the path of the movable member as when it is held at said second position, and free floating feed means consisting of a weighted mass connected by a flexible tie member to the support of said movable member in offset relation to said axis thereof, said weighted mass being raised from a normal position of rest when the movable member is moved to said second position and adapted upon release of the movable member by said holding means to fall under the pull of gravity and yieldably swing the support of the movable member so as to return the member to its initial position on the opposed side of the other member, a dashpot embodying a cylinder and a piston in said cylinder having a rod connected therewith, said rod being operably connected with the support of the movable member for moving said piston in the cylinder of said dashpot to counteract the gravital pull of said weighted mass on said support and said dashpot having valve means for adjusting the pressure on the piston in said cylinder whereby the swinging movement of the movable member relative to the other member may be controlled to be at a speed substantially no greater than the rate of removal of material by the tool from the surface of the lens member whereby a finely abraded finish on said surface of the lens member is obtained.

2. A lens surfacing device of the character described for simultaneously producing a desired lens surface shape having a finely abraded texture on a lens member to be subsequently polished comprising a support for holding the lens member with its surface exposed for abrading action, and a rotatable cupped abrading tool member impregnated with abrasive particles and carried by a second support, said tool member being mountable with its support for reciprocal movement through an arcuate path between a pair of limited positions, one position being to the left and the other being to the right of the lens member, and said path of movement being defined by an axis spaced from and substantially parallel with the general plane in which the surface of the lens member is supported, said movable tool member being normally maintained at rest at one of said positions and manually movable with its support to the other position, holding means on the device for releasably retaining said tool member at said second position, and manually operable adjustable means for bringing said lens member controllable amounts into the path of the tool member as when it is held at said second position, and free floating feed means embodying a weighted mass connected by a flexible tie member to the support of said tool member in offset relation to said axis thereof, said weighted mass being raised from a normal position of rest when the tool member is moved to said second position and adapted upon release of the tool member by said holding means to fall under the pull of gravity and yieldably swing the support of the tool member so as to return the tool member to its initial position on the opposed side of the lens member, a dashpot embodying a cylinder and a piston in said cylinder having a rod connected therewith, said rod being operably connected with the support of the tool member for moving said piston in the cylinder of said dashpot to counteract the gravital pull of said weighted mass on said support and said dashpot having valve means for adjusting the pressure on the piston in said cylinder whereby the swinging movement of the tool member relative to the lens member may be controlled to be at a speed substantially no greater than the rate of removal of material by the tool member from the surface of the lens member whereby a finely abraded finish on said surface of the lens member is obtained.

3. A lens surfacing device of the character described for simultaneously producing a desired lens surface shape having a finely abraded texture on a lens to be subsequently polished comprising a support for holding the lens with its surface exposed for abrading action, a rotatable cupped abrading tool impregnated with abrasive particles, and a supporting table for said tool, said table being mounted for pivotal movement about an axis spaced in substantially parallel relation with the general plane in which the surface of the lens is to be supported, the tool being adjustably mounted on said table for movement toward and away from the pivotal axis of the table to permit the tool to be swung by the table in arcs of different radii, and said movement of the table being reciprocal through an arcuate path between a pair of limited positions, one position being such as to position the tool to the left and the other being such as to position the tool to the right of the lens, said table being normally maintained at rest at one of said positions and manually movable to the other position, holding means on the device for releasably retaining said table at said second position, and manually operable adjustable means for bringing the lens controllable amounts into the path of the tool as when it is held at said second position on the table, and free floating feed means embodying a weighted mass connected by a flexible tie member to the table in offset relation to said axis thereof, said weighted mass being raised from a normal position of rest when the table is pivoted to said second position and adapted upon release of the table by said holding means to fall under the pull of gravity and yieldably swing the table so as to return the tool transversely of the lens surface to the opposed side thereof, a dashpot embodying a cylinder and a piston in said cylinder having a rod connected therewith, said rod being operably connected with the table for moving said piston in the cylinder of said dashpot to counteract the gravital pull of said weighted mass on said table and said dashpot having valve means for adjusting the pressure on the piston in said cylinder whereby the movement of the tool relative to the surface of the lens may be controlled to be at a speed substantially no greater than the rate of removal of material by the tool from said surface of the lens whereby a finely abraded finish on said surface of the lens is obtained.

4. A lens surfacing device of the character described for simultaneously producing a desired lens surface shape having a finely abraded texture on a lens to be subsequently polished comprising a support for holding the lens with its surface exposed for abrading action, a rotatable cupped abrading tool impregnated with abrasive particles, and supporting means for said tool, said supporting means including a table mounted for pivotal movement about an axis spaced in substantially parallel relation with the general plane in which the surface of the lens is to be supported, a slide member adjustably mounted on said table for movement toward and away from the pivotal axis of the table, and a tool support pivotally connected with said slide member for movement about an axis disposed substantially parallel with the axis of said table, the abrading portion of the tool being of curved cross section with the center of its curvature in substantial alignment with said pivotal axis of the tool support, and said movement of the table being reciprocal through an arcuate path between a pair of limited positions, one position being such as to position the tool to the left and the other being such as to position the tool to the right of the lens, said table being normally maintained at rest at one of said positions and manually movable to the other position, holding means on the device for releasably retaining said table at said second position, and manually operable adjustable means for bringing the lens controllable amounts into the path of the tool as when it is held at said second position on the table, and free floating feed means embodying a weighted mass connected by a flexible tie member to the table in offset relation to said axis thereof, said weighted mass being raised from a normal position of rest when the table is pivoted to said second position and adapted upon release of the table by said holding means to fall under the pull of gravity and yieldably swing the table so as to return the tool transversely of the lens surface to the opposed side thereof, a dashpot embodying a cylinder and a piston in said cylinder having a rod connected therewith, said rod being operably connected with the table for moving said piston in the cylinder of said dashpot to counteract the gravital pull of said weighted mass on said table and said dashpot having valve means for adjusting the pressure on the piston in said cylinder whereby the movement of the tool relative to the surface of the lens may be controlled to be at a speed substantially no greater than the rate of removal of material by the tool from said surface of the lens whereby a finely abraded finish on said surface of the lens is obtained.

PIERRE DE VITRY D'AVAUCOURT.

REFERENCES CITED

The following references are of record in the file of this patent:

UNITED STATES PATENTS

| Number | Name | Date |
|---|---|---|
| 1,261,765 | Challet | April 9, 1918 |
| 1,448,239 | Schuessler | Mar. 13, 1923 |
| 1,467,518 | Taylor | Sept. 11, 1923 |
| 1,901,181 | McCabe | Mar. 14, 1933 |
| 2,326,319 | Bailey | Aug. 10, 1943 |
| 2,354,509 | Dreher | July 25, 1944 |